United States Patent

[11] 3,621,167

[72] Inventor Harold J. Burke
Saginaw, Mich.

[21] Appl. No. 881,366
[22] Filed Dec. 2, 1969
[45] Patented Nov. 16, 1971
[73] Assignee General Motors Corporation
Detroit, Mich.

[54] PISTON SWITCH CONTROLLED BY FLUID AMPLIFIER WITH TIME DELAY
3 Claims, 6 Drawing Figs.

[52] U.S. Cl. .......... 200/82, 137/81.5, 200/81, 235/201
[51] Int. Cl. .......... H01h 43/28, F15c 1/14, H01h 35/38
[50] Field of Search .......... 200/82, 81.9, 34, 81; 137/81.5; 235/201 FS, 201 ME

[56] References Cited

UNITED STATES PATENTS

| | | | |
|---|---|---|---|
| 1,807,280 | 5/1931 | Carpenter | 200/82 X |
| 3,118,030 | 1/1964 | Palen | 200/82.2 |
| 3,171,915 | 3/1965 | Johnson | 200/81.9 |
| 3,340,896 | 9/1967 | Mon et al. | 137/81.5 X |
| 3,448,483 | 6/1969 | Jones, Jr. | 137/81.5 X |
| 3,461,898 | 8/1969 | Bellman et al. | 137/81.5 |
| 3,509,898 | 5/1970 | Monge et al. | 137/81.5 |

*Primary Examiner*—Robert K. Schaefer
*Assistant Examiner*—Robert A. Vanderhye
*Attorneys*—W. E. Finken, A. M. Heiter and D. F. Scherer ABSTRACT: A fluid oscillator actuator having a bistable fluid amplifier including low- and high-speed circuits, and an actuator portion including a fluid motor responsive to the fluid amplifier is shown and described. The oscillator is assembled in a unitary structure and includes timing elements such as restrictors and capacitors for the low-speed circuit. The oscillator may be operated in a vacuum envelope and use atmospheric air for the fluid amplifier power source or it may be operated in the atmosphere using superatmospheric fluid as the power source.

PATENTED NOV 16 1971

3,621,167

INVENTOR.
Harold J. Burke

BY
Donald F. Scherer
ATTORNEY

PISTON SWITCH CONTROLLED BY FLUID AMPLIFIER WITH TIME DELAY

This invention relates to fluid oscillating actuators and more particularly to devices in which the fluid amplifier and actuator are combined in a unitary modular structure.

In most prior art devices when it is desirable to control an actuator with a fluid amplifier, the fluid amplifier and actuator are contained in separate housings and connected by fluid conduits. The fluid conduits must be taken into consideration when timing values are critical during the operation of the fluidic system. These conduits may be subject to damage if they are not adequately protected. Damage to the conduits can cause a change in timing of the device or render the device inoperable. The present invention encloses the fluid amplifier, the operating circuit, and the actuator in a unitary structure thereby providing a compact device. The unitary modular structure of the present invention eliminates the need for exposed fluid conduits, thereby reducing possibilities of damage to the circuit. The structure can be enclosed within a case so that a vacuum may be drawn in the case thereby permitting the use of atmospheric air in the fluid amplifier. This is particularly useful with an internal combustion engine having an inlet manifold as a vacuum source.

It is an object of this invention to provide in an improved fluid actuator a unitary structure housing a fluid amplifier, control circuits for the amplifier, an actuator motor, and actuator output means.

It is another object of this invention to provide in an improved fluid actuator fluid amplifier control circuits and actuator means responsive to the fluid amplifier enclosed within a vacuum medium to permit the use of atmospheric air as the fluid amplifier power source.

These and other objects and advantages of the present invention will be more apparent from the following description and drawings in which.

Figures 1, 6:
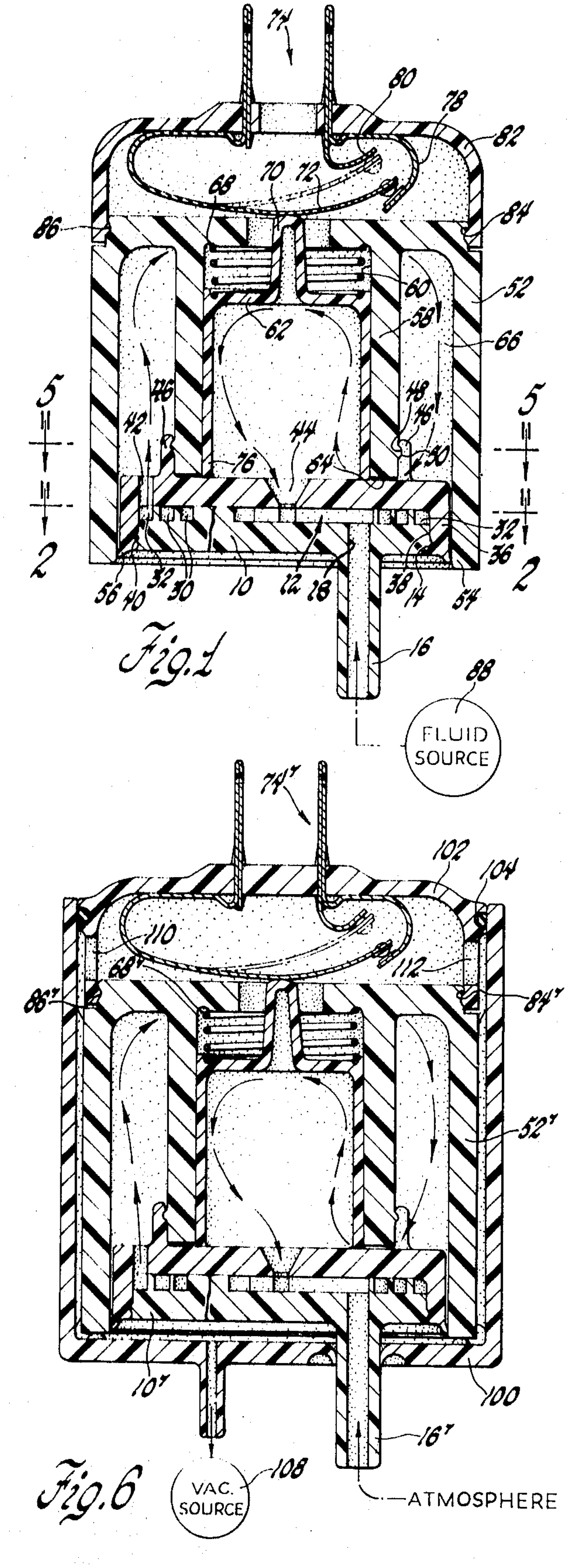
FIG. 1 is a cross-sectional elevational view of the actuator structure.
FIG. 6 is a cross-sectional elevational view of an actuator illustrating a modification of FIG. 1.
Figure 2:
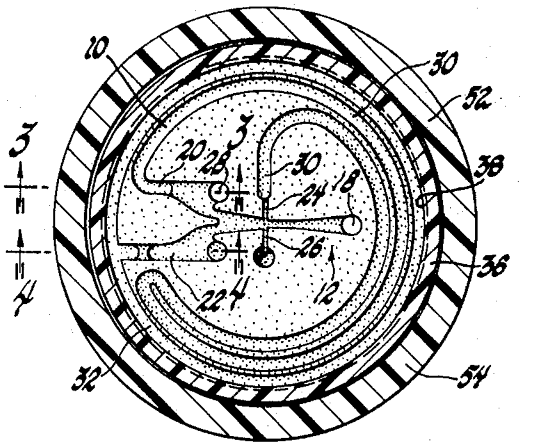
FIG. 2 is a cross-sectional view taken along line 2—2 in FIG. 1 showing the fluid amplifier.
Figure 3:
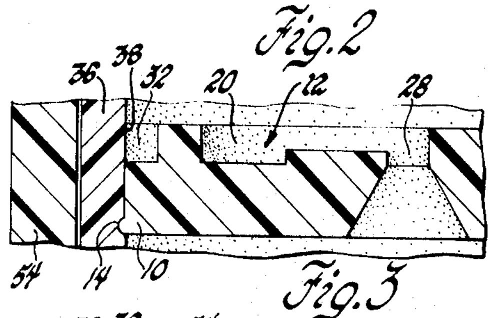
FIG. 3 is a cross-sectional view taken along line 3—3 in FIG. 2 showing a portion of the fluid amplifier.
Figure 4:
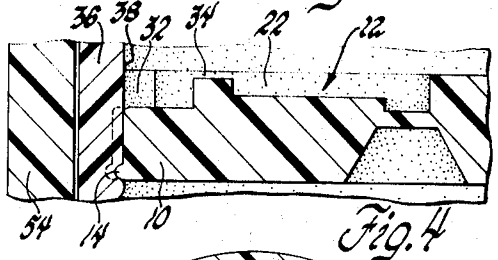
FIG. 4 is a cross-sectional view taken along line 4—4 of FIG. 2 showing another portion of the fluid amplifier.
Figure 5:
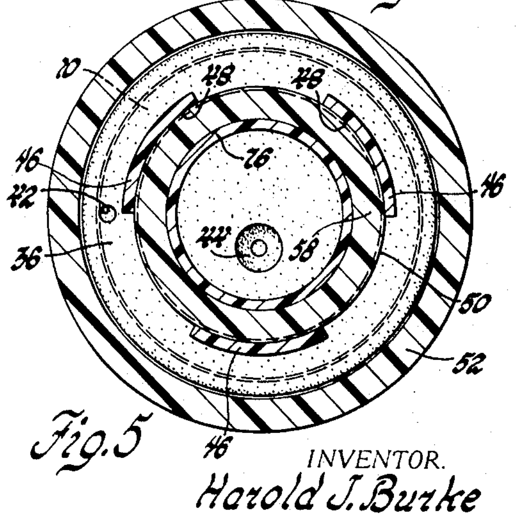
FIG. 5 is a cross-sectional view taken along line 5—5 of FIG. 1.

Referring to the drawings, there is shown a base plate 10 having a fluid amplifier generally designated 12 molded or machined therein. The base plate 10 is made of nylon or other suitable plastic composition and has a rim 14 protruding from the outer diameter thereof and an inlet tube 16 depending from the base plate 10.

The fluid amplifier 12 has an inlet port 18 in fluid communication with the inlet tube 16, a high-speed outlet port 20, a low-speed outlet port 22 and a pair of control ports 24 and 26. The outlet port 20 has a vent port 28 which is open to the fluid medium such as atmosphere surrounding the lower side of the base plate 10. Also molded into the base plate 10 is a high-speed passage 30 which provides fluid connection between the output port 20 and the control port 24. A low-speed passage 32 is in fluid communication with the output port 20 through a restrictor 34.

The base plate 10 is covered by an adapter plate 36 which has a cylindrical recess 38 sized to fit over the base plate 10 and having an annular recess 40 adapted to mate with the rim 14 to provide a locking connection between the base plate 10 and the adapter plate 36. The adapter plate 36 has a through aperture or passage 42 aligned with the low-speed passage 32 and a through passage 44 aligned with the control port 26. The adapter plate 36 has three upwardly extending lock arms 46 each having a locking recess 48 which are adapted to mate with a locking rim 50 on a piston housing 52 thereby providing a locking connection between the adapter plate 36 and the piston housing 52. The adapter plate 36 and the piston housing 52 are also made of nylon or a similar suitable plastic material.

The piston housing 52 has an outer cylindrical portion 54 which engages a sealing lip 56 on the adapter plate 36 to prevent fluid flow between the cylindrical portion 54 and the adapter plate 56. The piston housing 52 has an inner cylindrical portion 58 spaced from the cylindrical portion 54 and having an inner diameter 60 which provides a bore for an actuator piston 62 slidably disposed therein. The piston 62 and the bore cooperate to form a fluid actuator motor. The alignment of the lock groove 48 and the lock rim 50 space the lower end of the cylinder portion 58 slightly above the adapter plate 36 thereby providing three restrictor portions 64 for the low-speed circuit of the fluid amplifier 12. The space between the cylindrical portions 52 and 58 cooperate to form a capacitor 66 for the low-speed circuit.

The piston 62 is biased against the adapter plate 36 by a spring 68 and has an upwardly extending stem portion 70 which abuts a contact arm 72 of an electric switch 74. The inner portion 76 of the piston 62 is hollow and provides a variable capacitor for the low-speed circuit. The inner portion 76 is also in fluid communication with the passage 44.

The electric switch 74 has a second contact arm 78 which contacts the contact arm 72 when the piston 62 is in the position shown and a third contact arm 80 which provides a stop for the contact arm 72 and the piston 62 when the piston 62 is moved upwardly against the spring 68 by fluid pressure. The electric switch 74 is embedded in a cover 82 which has a lock ring 84 adapted to engage a lock groove 86 on the piston housing 52 to provide a locking connection therebetween.

In operation the fluid amplifier 12 is supplied with fluid pressure from a fluid source 88 to the inlet tube 16. The fluid entering the amplifier 12 is directed from the inlet port 18 to either the output port 20 or the output port 22. Assuming the fluid pressure is directed to the output port 20 the fluid will flow through the passage 30 to the control port 24 where it will cause the incoming fluid to be diverted from output port 20 to the low-speed output port 22. Fluid directed through the output port 22 and restrictor 34 to enter the low-speed passage 32 and then passes through passage 42 to the capacitor 66. From the capacitor 66 the fluid passes through the restrictors 64 and enters the inner portion of the piston 62. As the fluid pressure develops on the piston 62 it will be moved against the spring 68 thereby opening the switch 74. Also, as the fluid pressure develops on the piston 62 the fluid will be directed through passage 44 to the control port 26 which will cause the incoming fluid to be switched from outlet port 22 to outlet port 20 thereby permitting the piston 62 to return to the spring set position shown. The amount of time required for the pressure to develop on piston 62 and for the switch 74 to open is determined by the restrictor 34, the capacitor 66, and the restrictors 64. The time required to switch from the high-speed to the low-speed circuit is determined by the length of passage 30. Due to the longer time required to fill the low-speed circuit the electric switch 74 will be closed for a longer period than it is opened. When the fluid is flowing in the low-speed circuit, the high-speed circuit will be exhausted through the control port 24 and vent port 28. When the fluid is flowing in the high-speed circuit, the low-speed circuit will be exhausted through the control port 26.

The fluid actuator shown in FIG. 6 is similar in construction to the fluid actuator shown in FIG. 1 such that corresponding components will be given a same numerical designation with a prime affixed thereto. The piston housing 52′ is enclosed on its sides and its bottom by a case 100 which is sealed at the cover 102 by an O-ring 104. The case 100 has a vacuum connection adapted to be connected to a vacuum source 108 such that the volume immediately adjacent the piston housing 52′ is evacuated by the vacuum source. The cover 102 is secured to the piston housing 52′ in a manner identical to that described above for the cover 82. The cover 102 has a pair of openings 110 and 112 which permit the inner portion of the cover containing the contacts of the electric switch 74′ and the volume adjacent the spring 68′ to be evacuated by the vacuum source. The vent 28, not shown in FIG. 6, is open to the evacuated area between the base plate 10′ and the case 100 with the vent 28 being connected to the vacuum source atmospheric air will be drawn into the fluid amplifier so that it will enter the inlet port 18 and be directed to either of the output ports 20 or 22. The fluid amplifier will function in the same manner as that described above for the FIG. 1 actuator.

Obviously many modifications and variations will be apparent from the above description and illustrations of the preferred embodiments. It is therefore intended that the invention is defined only by the scope of the appended claims.

What is claimed is:

1. A fluid oscillator actuator structure comprising base plate means having fluid amplifier means, high-speed circuit means, and a portion of a low-speed circuit means; adapter plate means secured to said base plate means for providing a cover for said fluid amplifier means and having passages therein for providing fluid communication to and from said portion; piston housing means secured to said adapter plate means for providing a capacitor portion in fluid communication with one of said passages, a restrictor portion in fluid communication with said capacitor portion for the low-speed circuit means, and a piston housing in fluid communication with said restrictor portion and another of said passages; piston means slidably disposed in said piston housing; biasing means in said piston housing for urging said piston against said adapter plate means; cover means secured to said piston housing means having electrical switch means contacting said piston means and having an open and a closed position; a first pressure source surrounding said piston housing means and open to said cover means; and a second and higher pressure source in fluid communication with said fluid amplifier means for providing fluid thereto, whereby when said second pressure source is directed to the high-speed circuit said piston means is biased against said adapter plate and said electrical switch means is in one position and when said second pressure source is directed to the low-speed circuit said piston is moved against said biasing means and said electrical switch means is moved to the other position.

2. A unitary structure fluid oscillator actuator comprising base plate means having bistable fluid amplifier means with an input port, a pair of output ports and a pair of control ports, high-speed circuit means connected between one of said output ports and one of said control ports, and a portion of a low-speed circuit means connected to the other of said output ports; adapter plate means secured to said base plate means for providing a sealing cover for said fluid amplifier means and having passages therein in fluid communication with said portion of said low speed circuit means and said other control port; piston housing means sealingly secured to said adapter plate means for providing a capacitor portion of said low-speed circuit means in fluid communication with one of said passages, a restrictor portion of said low-speed circuit means in fluid communication with said capacitor portion, and a cylinder portion in fluid communication with said restrictor portion and another of said passages; piston means slidably disposed in said cylinder portion and cooperating with said cylinder portion for providing a variable capacitor for said low-speed circuit; biasing means in said cylinder portion for urging said piston against said adapter plate means; cover means secured to said piston housing means having electrical switch means contacting said piston means and having an open and a closed position; a first pressure source surrounding said piston housing means and open to said cover means; and a second and higher pressure source in fluid communication with said inlet port of said fluid amplifier means for supplying fluid thereto, whereby when said second pressure source is directed to the high-speed circuit by said fluid amplifier means said piston means is biased against said adapter plate and said electrical switch means is in one position and when said second pressure source is directed to the low-speed circuit by said fluid amplifier means said piston is moved against said biasing means and said electrical switch means is moved to the other position.

3. A unitary structure fluid actuator comprising fluid amplifier means; adapter plate means covering said fluid amplifier means; housing means including actuator motor means enclosing said adapter plate means; cover means secured to said housing means including actuator output means contacting said actuator motor means; case means in sealing relationship with said cover means and enclosing said housing means, said fluid amplifier means and said adapter plate means, and having vacuum connection means adapted to be connected to a vacuum source for providing a vacuum between said case means and said housing means; and atmospheric inlet means extending through said case means and being in fluid communication with said fluid amplifier means for providing a power source for said fluid amplifier means.

* * * * *